United States Patent
Lee et al.

(10) Patent No.: US 11,177,966 B2
(45) Date of Patent: Nov. 16, 2021

(54) METHOD AND APPARATUS FOR MANAGING ENROLLMENT CERTIFICATE IN SECURITY CREDENTIAL MANAGEMENT SYSTEM FOR V2X COMMUNICATION

(71) Applicant: Penta Security Systems Inc., Seoul (KR)

(72) Inventors: Seok Woo Lee, Seoul (KR); Duk Soo Kim, Seoul (KR); Eui Seok Kim, Seoul (KR); Sang Gyoo Sim, Seoul (KR); Jong Guk Lee, Suwon-si (KR); Dong Hoon Ko, Bucheon-si (KR); Jung Ook Kim, Seoul (KR); Sang Won Seo, Yongin-si (KR); Jeong Eun Ki, Seoul (KR); Seung Hoon Lee, Yongin-si (KR)

(73) Assignee: PENTA SECURITY SYSTEMS INC., Seoul (KR)

( * ) Notice: Subject to any disclaimer, the term of this patent is extended or adjusted under 35 U.S.C. 154(b) by 266 days.

(21) Appl. No.: 16/556,652

(22) Filed: Aug. 30, 2019

(65) Prior Publication Data
US 2020/0169420 A1    May 28, 2020

(30) Foreign Application Priority Data
Nov. 23, 2018    (KR) .......................... 10-2018-0146656

(51) Int. Cl.
*H04L 29/06*    (2006.01)
*H04L 9/32*    (2006.01)

(52) U.S. Cl.
CPC .......... *H04L 9/3265* (2013.01); *H04L 9/3268* (2013.01); *H04L 2209/30* (2013.01); *H04L 2209/38* (2013.01)

(58) Field of Classification Search
CPC . H04L 9/3265; H04L 9/3268; H04L 2209/30; H04L 2209/38; H04L 63/0823;
(Continued)

(56) References Cited

U.S. PATENT DOCUMENTS

| 2013/0096943 | A1* | 4/2013 | Carey | G06F 21/6263 705/2 |
| 2016/0087804 | A1* | 3/2016 | Park | H04W 4/40 713/156 |

(Continued)

FOREIGN PATENT DOCUMENTS

| CN | 104054084 A | * | 9/2014 | ............. G06F 21/10 |
| KR | 101584001 B1 | * | 1/2016 | ............. H04L 9/006 |

(Continued)

*Primary Examiner* — John B King
(74) *Attorney, Agent, or Firm* — Goldilocks Zone IP Law (57) ABSTRACT

A method for managing an enrollment certificate in an SCMS for V2X communication may comprise receiving a message requesting an authority for generating a CSR from a DCM; updating device certification data through a certification laboratory that manages performance and requirements of an EE, and verifying the EE that requested issuance of an enrollment certificate to the DCM by using the updated device certification data; transmitting response data indicating the authority for generating a CSR to the DCM based on a result of the verification; receiving a CSR generated according to the response data from the DCM; and verifying the received CSR, and requesting response data for the CSR to an ECA based on a result of the verification.

20 Claims, 6 Drawing Sheets

(58) Field of Classification Search
CPC ...... H04L 63/10; H04L 2209/84; H04W 4/40; H04W 4/44; H04W 4/46; H04W 28/065; H04W 12/084; H04W 12/069
See application file for complete search history.

(56) References Cited

U.S. PATENT DOCUMENTS

| | | | |
|---|---|---|---|
| 2016/0119151 A1* | 4/2016 | Park | H04L 9/3268 |
| | | | 713/158 |
| 2016/0352521 A1* | 12/2016 | Choi | H04L 9/007 |
| 2019/0007484 A1* | 1/2019 | Chen | H04W 4/40 |
| 2019/0053154 A1* | 2/2019 | Song | H04W 4/48 |
| 2019/0297499 A1* | 9/2019 | Hawkes | H04W 12/40 |
| 2019/0327618 A1* | 10/2019 | Li | H04W 4/029 |
| 2019/0379548 A1* | 12/2019 | Barrett | H04W 4/40 |
| 2020/0045552 A1* | 2/2020 | Kim | H04L 9/3268 |
| 2020/0252804 A1* | 8/2020 | Kim | H04W 12/02 |
| 2020/0259820 A1* | 8/2020 | McCall | H04L 9/3239 |

FOREIGN PATENT DOCUMENTS

| | | | | |
|---|---|---|---|---|
| KR | 20200015005 A | * | 2/2020 | |
| WO | WO-2017217070 A1 | * | 12/2017 | ............. G06F 21/33 |
| WO | WO-2018150546 A1 | * | 8/2018 | ............... H04L 9/08 |
| WO | WO-2018182198 A1 | * | 10/2018 | ............. H04W 4/40 |
| WO | WO-2018230833 A1 | * | 12/2018 | ......... H04W 12/121 |
| WO | WO-2020054079 A1 | * | 3/2020 | ............. H04W 4/46 |

* cited by examiner

METHOD AND APPARATUS FOR MANAGING ENROLLMENT CERTIFICATE IN SECURITY CREDENTIAL MANAGEMENT SYSTEM FOR V2X COMMUNICATION

CROSS-REFERENCE TO RELATED APPLICATIONS

This application claims the benefit of priority to Korean Patent Application No. 10-2018-0146656, filed on Nov. 23, 2018 in the Korean Intellectual Property Office (KIPO), the entire contents of which are incorporated herein by reference.

BACKGROUND

1. Technical Field

The present disclosure relates generally to a security credential management system (SCMS) for V2X communication, and more specifically, to a method and an apparatus for efficiently managing an enrollment certificate in the SCMS.

2. Related Art

Vehicle-to-Everything (V2X) communication is a key technology that assures the safety of the vehicle and facilitates autonomous driving by exchanging traffic information with traffic infrastructure such as roads, traffic lights, etc. and other vehicles through a wireless network.

Recently, as interests in the autonomous driving have increased, researches on the V2X communication, which carries out wireless communication between vehicle and everything by combining information communication technology (ICT) with automobiles, is actively under way.

The Institute of Electrical and Electronics Engineers (IEEE) 1609.2 has been proposed as a standard for solving security problems that may arise in the V2X communication. The IEEE 1609.2 is a security standard that a vehicle should adhere to in wireless communications with other vehicles or external systems, uses digital signatures and encryption techniques, and specifies the basis for ensuring secure communications based on certificates.

A security credential management system (SCMS) for V2X communication proposed in the IEEE 1609.2 manages an enrollment certificate, which is a certificate for determining an authority for requesting issuance of a security certificate for the V2X communication before issuing the security certificate.

In this case, there is a need for a method for enhancing security and smoothly performing a certification procedure by managing such the enrollment certificate more efficiently.

SUMMARY

Accordingly, exemplary embodiments of the present disclosure provide a method for managing an enrollment certificate in a security credential management system (SCMS) for V2X communication by relaying between an enrollment certificate authority (ECA) and a device configuration manager (DCM).

Accordingly, exemplary embodiments of the present disclosure also provide an apparatus for managing an enrollment certificate in an SCMS for V2X communication by relaying between an ECA and a DCM.

According to the exemplary embodiments of the present disclosure, a method for managing an enrollment certificate in an SCMS for V2X communication may comprise receiving a message requesting an authority for generating a certificate signing request (CSR) from a device configuration manager (DCM); updating device certification data through a certification laboratory that manages performance and requirements of an end entity (EE), and verifying the EE that requested issuance of an enrollment certificate to the DCM by using the updated device certification data; transmitting response data indicating the authority for generating a CSR to the DCM based on a result of the verification; receiving a CSR generated according to the response data from the DCM; and verifying the received CSR, and requesting response data for the CSR to an enrollment certificate authority (ECA) based on a result of the verification.

The method may further comprise, before the receiving of the message, providing access information for requesting the authority to the DCM.

The access information for the ECA may be managed so as not to be exposed to the DCM.

The requesting of the response data for the CSR may further comprise performing verification on the CSR by verifying at least one of a manufacturer name of the EE, a model name of the EE, a responsible person name of the EE, contact information of the EE, and the number of times the EE has requested an enrollment certificate.

The method may further comprise receiving the response data for the CSR from the ECA.

The response data for the CSR may include at least one of a local policy file, a local certificate chain file, the enrollment certificate, and an infrastructure certificate used for secure transmission of data between entities involved in certification in the SCMS.

The receiving of the response data for the CSR may comprise storing the response data for the CSR, managing a history of receiving the CSR, and generating situational data for the request and issuance of the enrollment certificate.

The method may further comprise transmitting the response data for the CSR to the DCM.

In the transmitting of the response data for the CSR to the DCM, the response data for the CSR may be verified, and only the verified response data may be transmitted to the DCM.

In the transmitting of the response data for the CSR to the DCM, the response data for the CSR may be transmitted to the DCM as compressed.

Furthermore, according to the exemplary embodiments of the present disclosure, an apparatus for managing an enrollment certificate in an SCMS for V2X communication may comprise at least one processor, and a memory storing instructions configuring the at least one processor to perform at least one step. Also, the at least one step may comprise receiving a message requesting an authority for generating a CSR from a DCM; updating device certification data through a certification laboratory that manages performance and requirements of an EE, and verifying the EE that requested issuance of an enrollment certificate to the DCM by using the updated device certification data; transmitting response data indicating the authority for generating a CSR to the DCM based on a result of the verification; receiving a CSR generated according to the response data from the DCM; and verifying the received CSR, and requesting response data for the CSR to an ECA based on a result of the verification.

The at least one step may further comprise, before the receiving of the message, providing access information for requesting the authority to the DCM.

The access information for the ECA may be managed so as not to be exposed to the DCM.

The requesting of the response data for the CSR may further comprise performing verification on the CSR by verifying at least one of a manufacturer name of the EE, a model name of the EE, a responsible person name of the EE, contact information of the EE, and the number of times the EE has requested an enrollment certificate.

The at least one step may further comprise receiving the response data for the CSR from the ECA.

The response data for the CSR may include at least one of a local policy file, a local certificate chain file, the enrollment certificate, and an infrastructure certificate used for secure transmission of data between entities involved in certification in the SCMS.

The receiving of the response data for the CSR may comprise storing the response data for the CSR, managing a history of receiving the CSR, and generating situational data for the request and issuance of the enrollment certificate.

The at least one step may further comprise transmitting the response data for the CSR to the DCM.

In the transmitting of the response data for the CSR to the DCM, the response data for the CSR may be verified, and only the verified response data may be transmitted to the DCM.

In the transmitting of the response data for the CSR to the DCM, the response data for the CSR may be transmitted to the DCM as compressed.

In the SCMS for V2X communication according to the exemplary embodiments of the present disclosure, using the method and apparatus for managing an enrollment certificate, the load of the ECA can be remarkably reduced by distributing CSRs received from a plurality of DCMs.

In addition, the CSR response data including the enrollment certificate and the history of issuance of the enrollment certificates can be managed. Also, there is an advantage that the security can be enhanced by verifying the EE requesting the issuance of the enrollment certificate to the DCM, the CSR, and the CSR response data. Also, batching of the response data can be efficiently performed by compressing and transmitting the CSR response data. Further, by using the infrastructure certificate issued by the ICA, the certificate trust chain can be created between the respective certificate authorities, thereby assuring the trust of mutual data transmission.

BRIEF DESCRIPTION OF DRAWINGS

Exemplary embodiments of the present disclosure will become more apparent by describing in detail exemplary embodiments of the present disclosure with reference to the accompanying drawings, in which.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Exemplary embodiments of the present disclosure are disclosed herein. However, specific structural and functional details disclosed herein are merely representative for purposes of describing exemplary embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. To facilitate general understanding in describing the present disclosure, the same components in the drawings are denoted with the same reference signs, and repeated description thereof will be omitted.

Figure 1:
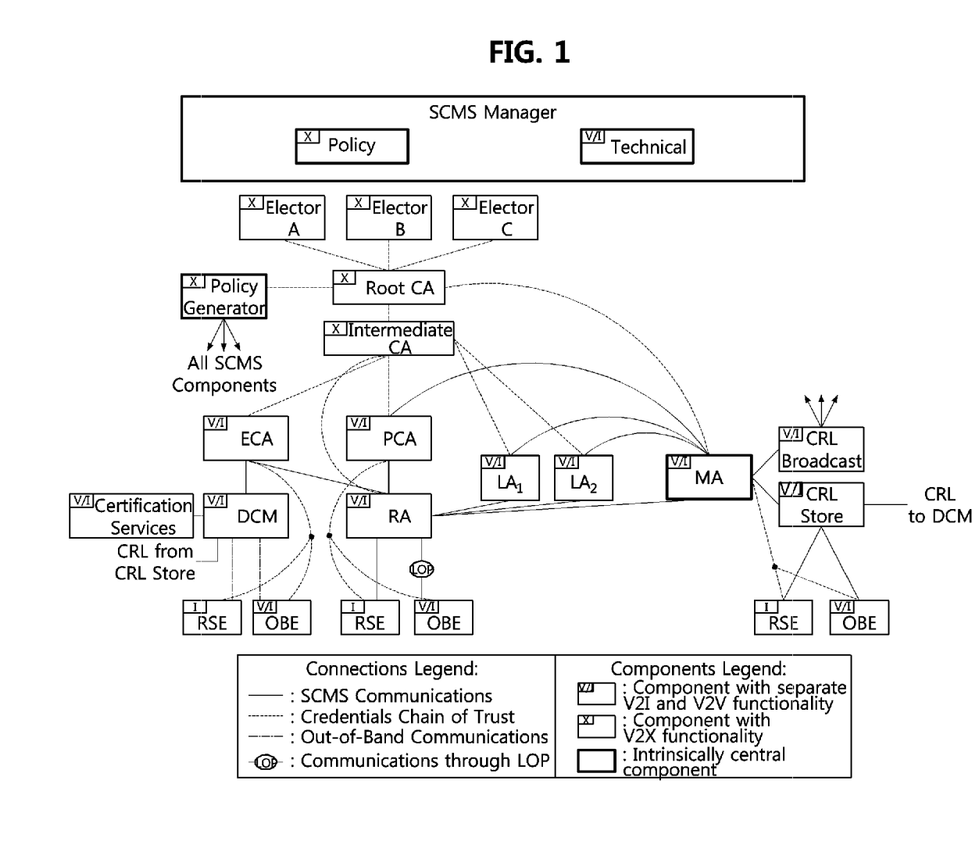
FIG. 1 is a conceptual diagram of an SCMS defined by the IEEE 1609.2.

FIG. 1 is a conceptual diagram of an SCMS defined by the IEEE 1609.2.

Referring to FIG. 1, an SCMS may perform security certification for V2X communication by a plurality of components communicating with each other. Here, each of the components shown in FIG. 1 may be implemented as one server or one apparatus, or two or more components may be combined into one server or one apparatus. Among the components, components denoted by 'V/I' may correspond to components having Vehicle-to-Infrastructure (V2I) and/or Vehicle-to-Vehicle (V2V) communication functions, components denoted by 'X' may correspond to components having V2X communication functions, and components denoted by a bold line may correspond to intrinsically central components.

In FIG. 1, an onboard equipment (OBE) shown at the bottom is a component that is embedded in a vehicle and performs V2X communication, and may be referred to as an onboard unit (OBU). Also, a road side equipment (RSE) means various devices (e.g., traffic lights) installed in a roadside to assist in traffic and autonomous driving, or may be a component that is embedded in such the devices and is responsible for the V2X communication. The RSE may be referred to as a roadside unit (RSU). The OBE and RSE are entities that perform the V2X communication directly. Since they belong to the lowest layer that receives a security certificate from the SCMS and is managed by the SCMS, each of they may be collectively referred to as an 'end-entity' (hereinafter referred to as 'EE').

Here, the EE may work with a registration authority (RA) of the SCMS in order to receive a security certificate for transmitting messages for V2X communication. The RA may receive a certificate signing request (hereinafter referred to as 'CSR') from an EE, request a linkage value to a linkage authority (LA), receive the linkage value, ensure anonymity for the entity requesting the issuance of the security certificate by shuffling the CSRs, and request the security certificate to a pseudonym certificate authority (PCA). Also, the RA may be able to assign a security certificate to each EE (i.e., batching) and manage an enrollment blacklist.

Upon receipt of the security certificate request from the RA, the PCA may issue an anonymous certificate that is exchanged between vehicles in V2V communication and has a short validity period, an application certificate used in infrastructure devices including the RSE, and/or a real name certificate, and transmit the one or more issued certificates to the RA.

The LA may generate a linkage value used to generate the anonymous certificate, and may provide linkage values included in a certificate to revoke the certificate.

Meanwhile, before receiving the security certificate, the EE may receive an enrollment certificate to prove an authority for requesting the issuance of the security certificate. The enrollment certificate may be classified into an enrollment certificate for a vehicle (or, OBE) and an enrollment certificate for an RSE. The functions and issuance-related matters of the enrollment certificate for vehicle may be as shown in Table 1 below.

TABLE 1

| | Enrollment certificate for vehicle (OBE) |
|---|---|
| Functions | Vehicle identification<br>Certificate used for identifying a vehicle by using unique information of the vehicle and a device<br>Authority for issuing a security certificate<br>Assign an authority for requesting issuance of a security certificate.<br>Role of a certificate<br>Indicate authority for requesting an anonymous certificate/real name certificate for signing messages transmitted and received in V2I/V2V. |
| Issuance | Request of issuance of enrollment certificate<br>generate a CSR key pair for generating an enrollment certificate, and request generation of a certificate (i.e., CSR) to a certificate authority by using the generated key pair.<br>Request of issuance<br>DCM requests issuance (using vehicle information)<br>ECA issues an enrollment certificate |

Also, the functions and issuance-related matter of the enrollment certificate for an RSE may be as shown in Table 2 below.

TABLE 2

| | Enrollment certificate for RSE |
|---|---|
| Functions | RSE identification<br>Certificate used for identifying an RSE by using unique information of the RSE |

TABLE 2-continued

Enrollment certificate for RSE

| | |
|---|---|
| | Authority for issuing an application certificate<br>Assign an authority for requesting issuance of an application certificate.<br>Role of a certificate<br>Indicate authority for requesting an application certificate for signing<br>messages transmitted and received in V2I. |
| Issuance | Request of issuance of application certificate<br>generate a CSR key pair for generating an application certificate, and<br>request generation of a certificate (i.e., CSR) to a certificate authority by<br>using the generated key pair.<br>Request of issuance<br>DCM requests issuance (using identification ID information of an RSE)<br>ECA issues an enrollment certificate |

In order to receive an enrollment certificate, the EE may request issuance of an enrollment certificate to a device configuration manager (DCM). The DCM may provide the EE with information needed to request the enrollment certificate, and may provide new credit information to the EE. In addition, the DCM may transmit an issuance request for an enrollment certificate to an enrollment certificate authority (ECA).

The ECA may issue and manage an enrollment certificate, and transmit the issued enrollment certificate to the EE via the DCM.

A certification service may register information about devices (e.g., roadside units, vehicles, traffic lights, or EEs which perform V2X communication) that are subject to the issuance of the certificate issuance, and identify vehicle terminals qualified to receive the enrollment certificate during a bootstrap process. Further, the certification service may test batches for complying with performance and industry standards. Here, the certification service may also be referred to as a certification laboratory (i.e., certification lab).

A misbehavior authority (MA) may be a component that detects, searches, and manages the risks to the vehicle. At this time, the MA may include a repository on the network (which may be referred to as a 'CRL Store') so as to store a certificate revocation list (hereinafter referred to as a 'CRL') and distribute it on demand. The MA may include a CRL generator that generates and signs the CRL and manages linkage values of the misbehaving devices. In addition, if it is needed to detect a malfeasance in a system when messages exchanged between EEs are implausible and there is a potential malfunction, the MA may include a device (which may be referred to as a 'misbehavior report store' or 'global detection') that collects misbehavior reports from the EEs and determines revocation of the certification registration of the device for which an abnormal behavior has been detected.

The MA may include a CRL broadcast that broadcasts a current CRL to be downloaded by the OBE.

A policy generator may be a component that signs a global policy file to be applied to all the SCMS components.

A root certificate authority (CA) is a master component of all other certificate authorities (CAs), and may generate a self-signed certificate and provide the generated certificate to other components. Here, the root CA is a top-level certificate authority and may issue certificates to an intermediate CA (ICA), the MA, the CRL generator, and the policy generator.

An SCMS manager may be a component that manages security and certification policies for V2X communication and supports technical elements.

Figure 2:
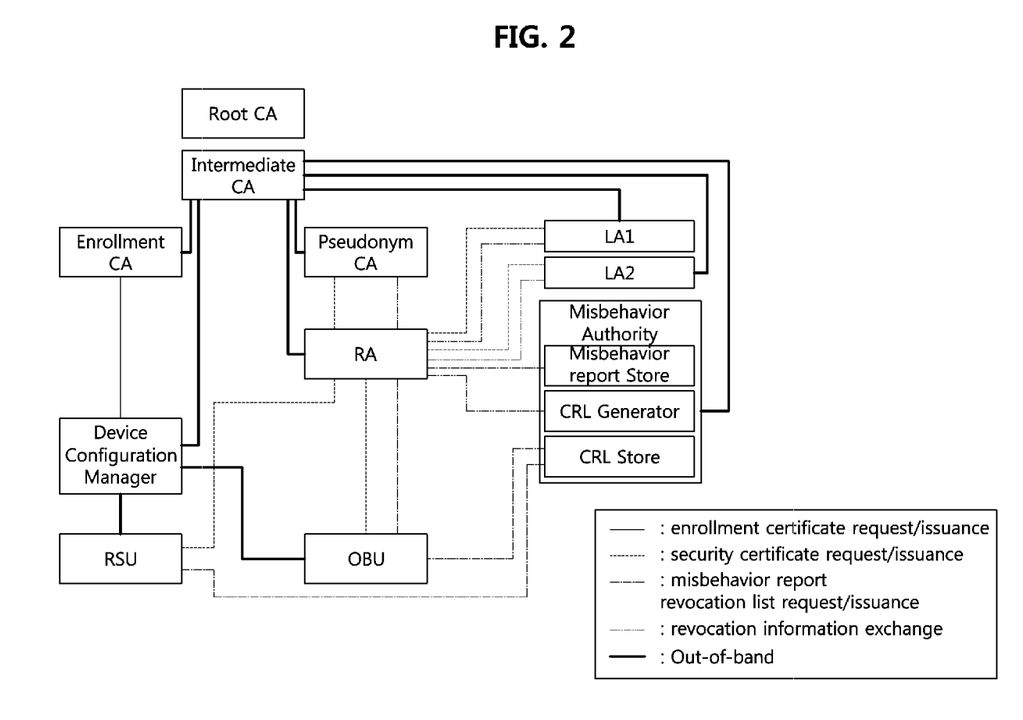
FIG. 2 is an exemplary diagram illustrating an SCMS according to requirements defined in the IEEE 1609.2.
Figure 3:
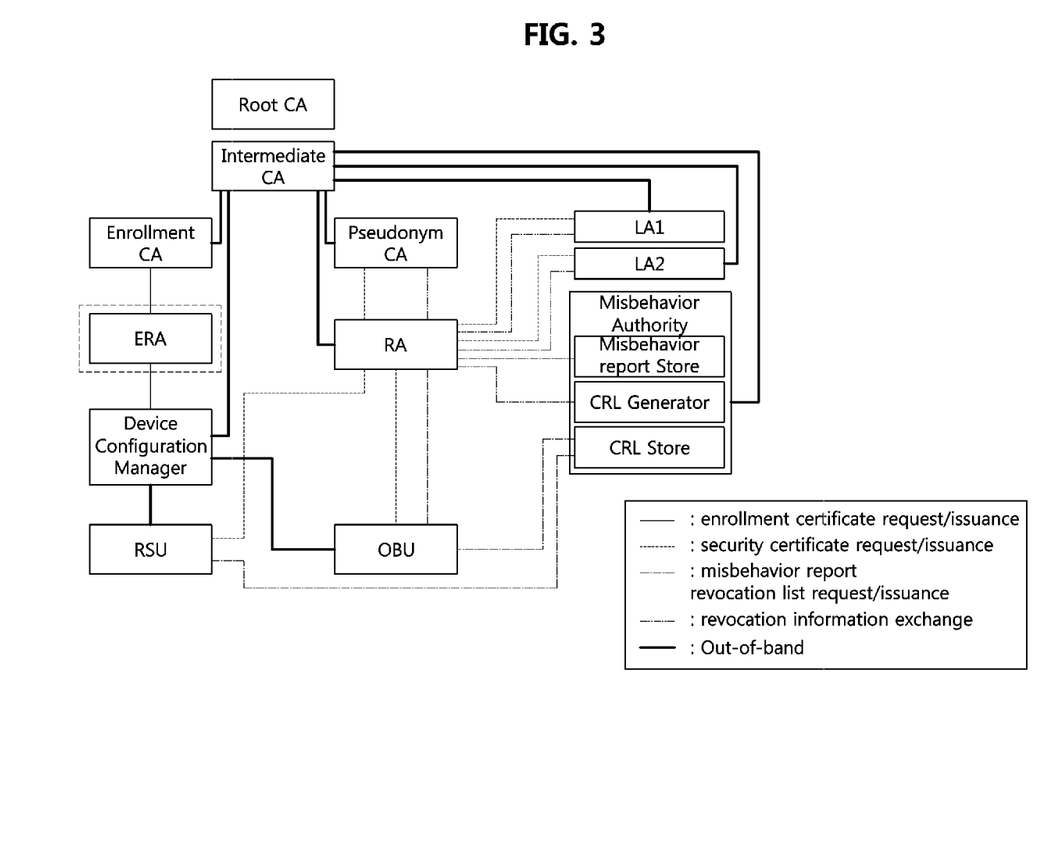
FIG. 3 is an exemplary diagram illustrating the SCMS of FIG. 2, to which an apparatus for managing enrollment certificates according to an exemplary embodiment of the present disclosure is added.

FIG. 2 is an exemplary diagram illustrating an SCMS according to requirements defined in the IEEE 1609.2. FIG. 3 is an exemplary diagram illustrating the SCMS of FIG. 2, to which an apparatus for managing enrollment certificates according to an exemplary embodiment of the present disclosure is added.

Referring to FIG. 2, according to the SCMS illustrated in FIG. 1, a connection relationship between components involved in request/issuance of an enrollment certificate and a security certificate, and a connection relationship between components involved in revocation of certificates due to the misbehavior detection may be identified.

Referring to the connection relationship for the request/issuance of the security certificate, the RA may perform a role of relaying between the EE and the PCA.

Unlike the request/issuance of the security certificate, referring to the connection relationship for the request/issuance of the enrollment certificate, the DCM may request the ECA managing the enrollment certificates to issue the enrollment certificate so that the issuance of the enrollment certificate may proceed. That is, since the enrollment certificate is issued through direct communication between the DCM and the ECA, there may be a problem that it is difficult to distribute issuance requests when there are many issuance requests. Also, if there is a CSR of an EE, an entity for examining such the CSR may be unclear. Also, since the DCM directly communicates with the certification service (or, certification lab) to identify the target of the certificate issuance, access information for the certification lab may be exposed to a plurality of DCMs. In addition, since there is no repository for storing response data for the CSR received from the ECA by the DCM, there is a problem that the issuance request is again received when the certificate issuance is needed again. Also, a method of transmitting the response data from the ECA to the DCM, a security thereof, and the like are unclear. Further, there is a problem that the ECA may be exposed to the outside through the DCM due to the direct communication between the DCM and the ECA. Also, the DCM may transmit the response data for the CSR by manually compressing it, or may transmit the response data for the CSR without compression.

Referring to FIG. 3, in order to solve the above problems, the present disclosure proposes a method for adding an apparatus for managing the enrollment certificate by relaying between the ECA and the DCM, and issuing the enrollment certificate through the added apparatus. The apparatus for managing the enrollment certificate according to an exemplary embodiment of the present disclosure is shown in FIG. 3 under a name of an enrollment registration authority (ERA).

When the ERA for managing the enrollment certificate is used according to an exemplary embodiment of the present disclosure, the ERA may examine the CSR requested from the DCM, and thus the entity responsible for examination of the CSR may be clarified. Also, if there is a CSR of the DCM, the ERA may identify the certificate issuance target device through the certification lab, thereby solving the problem that the access information for the certification lab is exposed to a plurality of DCMs. Also, even when CSRs occur from a plurality of DCMs, the CSRs can be properly distributed. Also, the ERA may store the response data for the CSR received from the ECA, so that it can be downloaded at any time if there is an additional issuance request. Further, by using an infrastructure certificate received from the ICA, the DCM, the ECA, and the ERA can perform mutually-secure and reliability-guaranteed communications. Also, since the ECA communicates with the DCM through the ERA according to the present disclosure without directly communicating with the DCM, it is possible to prevent the ECA from being exposed to the outside. Further, the ERA according to the present disclosure can perform efficient batching by automatically compressing the response data for the CSR transmitted from the ECA and transmitting the compressed data to the DCM.

Figure 4:
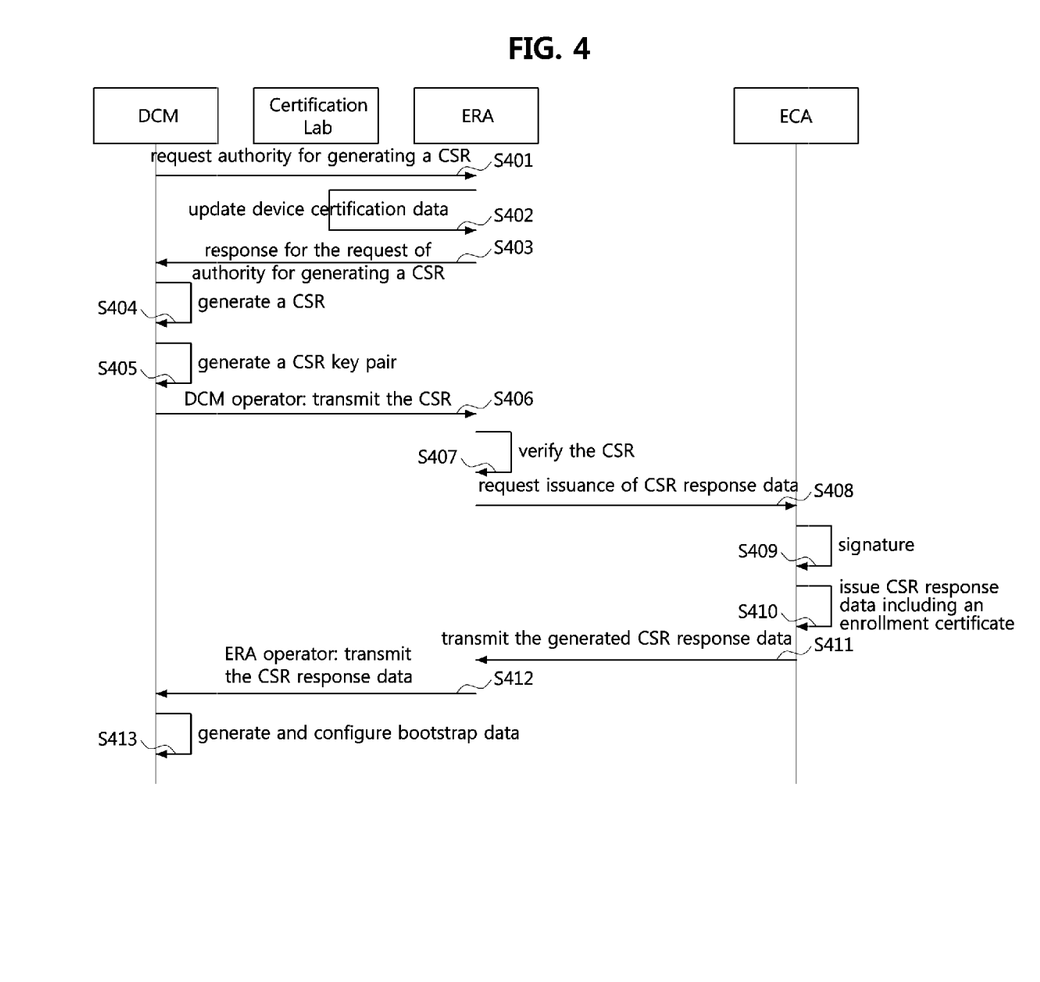
FIG. 4 is a sequence diagram illustrating a method for managing an enrollment certificate according to an exemplary embodiment of the present disclosure.

FIG. 4 is a sequence diagram illustrating a method for managing an enrollment certificate according to an exemplary embodiment of the present disclosure.

As a preliminary procedure for issuing an enrollment certificate, when an EE (or, information of the EE) to be certificated is submitted to the certification lab, the certification lab may determine whether the EE satisfies predefined requirements, and may perform certification for the EE satisfying the requirements. The certification lab may store certification documents and device information for the EE that has been certificated in a database.

When the preliminary procedure is completed, a procedure for issuing an enrollment certificate may be performed. Referring to FIG. 4, the DCM may request an authority for generating a CSR to the ERA (S401). Here, the authority for generating a CSR may refer to an entitlement or an authority to generate the CSR for the EE for which the DCM is requested to issue an enrollment certificate. In this case, the DCM may receive ERA access information from the ERA in advance, and may access the ERA using the received ERA access information. That is, since the DCM accesses the ERA using only the ERA access information, it is made possible to prevent the ECA from being exposed to the outside.

The ERA may receive updated device certification data from the certification lab, determine an authority for generating a CSR using the updated device certification data, and generate response data for the request of the authority for generating a CSR, which is received from the DCM based on the determination result (S402). Also, the ERA may transmit the generated response data to the DCM (S403). When the DCM determines that the DCM is eligible to generate a CSR by referring to the response data, the DCM may generate a CSR (S404). Also, the DCM may generate a CSR key pair (S405). The DCM may transmit the generated CSR to the ERA (S406), and the ERA may perform verification on the CSR received from the DCM (S407). Specifically, the ERA may verify the CSR by verifying a manufacturer's name of the EE, a model name of the EE, a responsible person's name, contact information, and the number of times the EE has requested an enrollment certificate to DCM. When the verification of the CSR is completed, the ERA may request the ECA to generate CSR response data (S408).

The ECA may generate an enrollment certificate including an identifier (ID), a validity period, a permission (i.e., area information, PSID, etc.), a signature (S409), and generate CSR response data including the generated enrollment certificate (S410). Here, the CSR response data may include at least one of a local policy file, a local certificate chain file, the enrollment certificate, an RA certificate, an ECA certificate, a Root CA certificate, and a Root.tls. Here, the RA certificate, the ECA certificate, and the Root CA certificate may be infrastructure certificates used for institutional certification for exchanging information between trust authorities (i.e., entities involved in issuance of the security certificate and the enrollment certificate except the EEs in FIG. 1 or 2) involved in issuing the security certificate or the enrollment certificate. These infrastructure certificates may be generated by an intermediate certificate authority (ICA) to create a certificate trust chain between the certificate authorities.

The ECA may transmit the generated CSR response data to the ERA (S411), and the ERA may transmit the received CSR response data to the DCM (S412). Here, the ERA may compress the CSR response data received from the ECA, and transmit it to the DCM (i.e., batching function for the response data). Also, the ERA may manage the request and issuance status of the enrollment certificate by storing the CSR response data and managing a history of receiving the CSR. Also, the ERA may verify the CSR response data (or the enrollment certificate included in the CSR response data), and may transmit only the verified CSR response data to the DCM.

The DCM may apply and configure bootstrap data to the EE using the received CSR response data (S413). In this case, the bootstrap data may include at least one of the local policy file, the local certificate chain file, the enrollment certificate, the RA certificate, the ECA certificate, the Root CA certificate, the Root.tls, a private key for the enrollment certificate, and a value obtained by reconstructing the private key.

Figure 5:
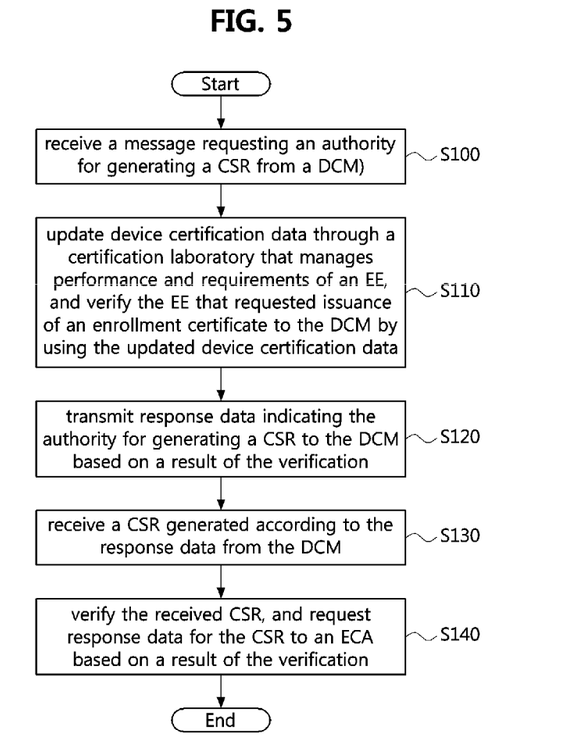
FIG. 5 is a flowchart illustrating a method for managing an enrollment certificate in an SCMS for V2X communication according to an exemplary embodiment of the present disclosure.

FIG. 5 is a flowchart illustrating a method for managing an enrollment certificate in an SCMS for V2X communication according to an exemplary embodiment of the present disclosure.

Referring to FIG. 5, a method for managing an enrollment certificate in an SCMS for V2X communication may comprise a step S100 of receiving a message requesting authority for generating a CSR from a DCM, a step S110 of updating device certification data through a certification laboratory that manages performance and requirements of an end entity (EE), and verifying the EE that requested issuance of an enrollment certificate to the DCM by using the updated device certification data, a step S120 of transmitting response data indicating the authority for generating a CSR to the DCM based on a result of the verification, a step S130 of receiving a CSR generated according to the response data from the DCM, and a step S140 of verifying the received CSR, and requesting response data for the CSR to an ECA based on a result of the verification.

The method may further comprise, before the receiving of the message, a step of providing access information for requesting the authority to the DCM.

The access information for the ECA may be managed so as not to be exposed to the DCM.

The step of 140 of requesting of the response data for the CSR may further comprise a step of performing verification on the CSR by verifying at least one of a manufacturer name of the EE, a model name of the EE, a responsible person name of the EE, contact information of the EE, and the number of times the EE has requested an enrollment certificate.

The method may further comprise a step of receiving the response data for the CSR from the ECA.

The response data for the CSR includes at least one of a local policy file, a local certificate chain file, the enrollment certificate, and an infrastructure certificate used for secure transmission of data between entities involved in certification in the SCMS.

The step of receiving the response data for the CSR from the ECA may comprise a step of storing the response data for the CSR, managing a history of receiving the CSR, and generating situational data for the request and issuance of the enrollment certificate.

The method may further comprise a step of transmitting the response data for the CSR to the DCM.

In the transmitting of the response data for the CSR to the DCM, the response data for the CSR may be verified, and only the verified response data may be transmitted to the DCM.

In the transmitting of the response data for the CSR to the DCM, the response data for the CSR may be transmitted to the DCM as compressed.

Figure 6:
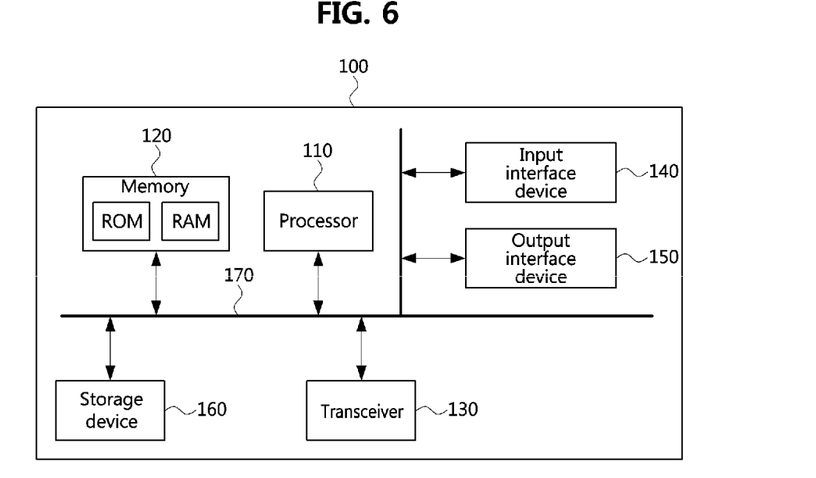
FIG. 6 is a block diagram illustrating an apparatus for managing an enrollment certificate in an SCMS for V2X communication according to an exemplary embodiment of the present disclosure.

FIG. 6 is a block diagram illustrating an apparatus for managing an enrollment certificate in an SCMS for V2X communication according to an exemplary embodiment of the present disclosure.

Referring to FIG. 6, an apparatus 100 for managing an enrollment certificate in an SCMS may comprise at least one processor and a memory storing instructions configuring the at least one processor to perform at least one step.

The at least one processor 110 may be a central processing unit (CPU), a graphics processing unit (GPU), or a dedicated processor on which methods in accordance with the exemplary embodiments of the present disclosure are performed. Each of the memory 120 and a storage device 160 may be constituted of at least one of a volatile storage medium and a nonvolatile storage medium. For example, the memory 120 may comprise at least one of a read only memory (ROM) and a random access memory (RAM).

Also, the apparatus 100 for managing an enrollment certificate may further comprise a transceiver 130 performing communications through a wired or wireless network. Also, the apparatus 100 for managing an enrollment certificate may further comprise an input interface device 140, an output interface device 150, the storage device 160, and the like. The respective components included in the apparatus 100 may be connected by a bus 170 and communicate with each other.

The at least one step may comprise a step of receiving a message requesting authority for generating a CSR from a DCM, a step of updating device certification data through a certification laboratory that manages performance and requirements of an end entity (EE), and verifying the EE that requested issuance of an enrollment certificate to the DCM by using the updated device certification data, a step of transmitting response data indicating the authority for generating a CSR to the DCM based on a result of the verification, a step of receiving a CSR generated according to the response data from the DCM, and a step of verifying the received CSR, and requesting response data for the CSR to an ECA based on a result of the verification.

The at least one step may further comprise, before the receiving of the message, a step of providing access information for requesting the authority to the DCM.

The access information for the ECA may be managed so as not to be exposed to the DCM.

The step of requesting of the response data for the CSR may further comprise a step of performing verification on the CSR by verifying at least one of a manufacturer name of the EE, a model name of the EE, a responsible person name of the EE, contact information of the EE, and the number of times the EE has requested an enrollment certificate.

The at least one step may further comprise a step of receiving the response data for the CSR from the ECA.

The response data for the CSR includes at least one of a local policy file, a local certificate chain file, the enrollment certificate, and an infrastructure certificate used for secure transmission of data between entities involved in certification in the SCMS.

The step of receiving the response data for the CSR from the ECA may comprise a step of storing the response data for the CSR, managing a history of receiving the CSR, and generating situational data for the request and issuance of the enrollment certificate.

The at least one step may further comprise a step of transmitting the response data for the CSR to the DCM.

In the transmitting of the response data for the CSR to the DCM, the response data for the CSR may be verified, and only the verified response data may be transmitted to the DCM.

In the transmitting of the response data for the CSR to the DCM, the response data for the CSR may be transmitted to the DCM as compressed.

The above-described apparatus 100 may be a desktop computer, a laptop computer, a notebook, a smart phone, a tablet PC, a mobile phone, a smart watch, a smart glass, an e-book reader, a portable multimedia player (PMP), a portable gaming machine, a navigation apparatus, a digital camera, a digital multimedia broadcasting (DMB) player, a digital audio recorder, a digital video recorder, a digital video player, a personal digital assistant (PDA), or the like which has communication capability.

The exemplary embodiments of the present disclosure may be implemented as program instructions executable by a variety of computers and recorded on non-transitory a computer readable medium. The non-transitory computer readable medium may include a program instruction, a data file, a data structure, or a combination thereof. The program instructions recorded on the non-transitory computer readable medium may be designed and configured specifically for the present disclosure or may be publicly known and available to those who are skilled in the field of computer software.

Examples of the non-transitory computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device may be configured to operate as at least one software module to perform the exemplary embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A method for managing an enrollment certificate in a security credential management system (SCMS) for vehicle-to-everything (V2X) communication, the method comprising:
   receiving a message requesting an authority for generating a certificate signing request (CSR) from a device configuration manager (DCM);
   updating device certification data through a certification laboratory that manages performance and requirements of an end entity (EE), and verifying the EE that requested issuance of an enrollment certificate to the DCM by using the updated device certification data;
   transmitting response data indicating the authority for generating the CSR to the DCM based on a result of the verification of the EE that requested issuance of the enrollment certificate to the DCM;
   receiving the CSR generated according to the response data from the DCM; and
   verifying the received CSR, and requesting response data for the received CSR to an enrollment certificate authority (ECA) based on a result of the verification of the received CSR.

2. The method according to claim 1, further comprising, before the receiving of the message, providing access information for requesting the authority to the DCM.

3. The method according to claim 2, wherein the access information for the ECA is managed so as not to be exposed to the DCM.

4. The method according to claim 1, wherein the requesting of the response data for the CSR further comprises performing verification on the CSR by verifying at least one of a manufacturer name of the EE, a model name of the EE, a responsible person name of the EE, contact information of the EE, and a number of times the EE has requested an enrollment certificate.

5. The method according to claim 1, further comprising receiving the response data for the CSR from the ECA.

6. The method according to claim 5, wherein the response data for the CSR includes at least one of a local policy file, a local certificate chain file, the enrollment certificate, and an infrastructure certificate used for secure transmission of data between entities involved in certification in the SCMS.

7. The method according to claim 5, wherein the receiving of the response data for the CSR comprises storing the response data for the CSR, managing a history of receiving the CSR, and generating situational data for the request and issuance of the enrollment certificate.

8. The method according to claim 5, further comprising transmitting the response data for the CSR to the DCM.

9. The method according to claim 8, wherein in the transmitting of the response data for the CSR to the DCM, the response data for the CSR is verified, and only the verified response data is transmitted to the DCM.

10. The method according to claim 8, wherein in the transmitting of the response data for the CSR to the DCM, the response data for the CSR is transmitted to the DCM in a compressed format.

11. An apparatus for managing an enrollment certificate in a security credential management system (SCMS) for vehicle-to-everything (V2X) communication, the apparatus comprising at least one processor, and a memory storing instructions configuring the at least one processor to perform the following steps:
   receiving a message requesting an authority for generating a certificate signing request (CSR) from a device configuration manager (DCM);
   updating device certification data through a certification laboratory that manages performance and requirements of an end entity (EE), and verifying the EE that requested issuance of an enrollment certificate to the DCM by using the updated device certification data;
   transmitting response data indicating the authority for generating the CSR to the DCM based on a result of the verification of the EE that requested issuance of the enrollment certificate to the DCM;
   receiving the CSR generated according to the response data from the DCM; and
   verifying the received CSR, and requesting response data for the received CSR to an enrollment certificate authority (ECA) based on a result of the verification of the received CSR.

12. The apparatus according to claim 11, wherein the at least one step further comprises, before the receiving of the message, providing access information for requesting the authority to the DCM.

13. The apparatus according to claim 11, wherein the access information for the ECA is managed so as not to be exposed to the DCM.

14. The apparatus according to claim 11, wherein the requesting of the response data for the CSR further comprises performing verification on the CSR by verifying at least one of a manufacturer name of the EE, a model name of the EE, a responsible person name of the EE, contact information of the EE, and a number of times the EE has requested an enrollment certificate.

15. The apparatus according to claim 11, wherein the at least one step further comprises receiving the response data for the CSR from the ECA.

16. The apparatus according to claim 15, wherein the response data for the CSR includes at least one of a local policy file, a local certificate chain file, the enrollment certificate, and an infrastructure certificate used for secure transmission of data between entities involved in certification in the SCMS.

17. The apparatus according to claim 15, wherein the receiving of the response data for the CSR comprises storing the response data for the CSR, managing a history of receiving the CSR, and generating situational data for the request and issuance of the enrollment certificate.

18. The apparatus according to claim 15, wherein the at least one step further comprises transmitting the response data for the CSR to the DCM.

19. The apparatus according to claim 18, wherein in the transmitting of the response data for the CSR to the DCM, the response data for the CSR is verified, and only the verified response data is transmitted to the DCM.

20. The apparatus according to claim 18, wherein in the transmitting of the response data for the CSR to the DCM, the response data for the CSR is transmitted to the DCM in a compressed format.

* * * * *